(12) United States Patent  (10) Patent No.: US 9,162,545 B1
Wilson  (45) Date of Patent: Oct. 20, 2015

(54) AMPHIBIOUS MACHINE

(71) Applicant: Paul K. Wilson, Madisonville, LA (US)

(72) Inventor: Paul K. Wilson, Madisonville, LA (US)

( * ) Notice: Subject to any disclaimer, the term of this patent is extended or adjusted under 35 U.S.C. 154(b) by 47 days.

(21) Appl. No.: 13/960,428

(22) Filed: Aug. 6, 2013

(51) Int. Cl.
*B60F 3/00* (2006.01)

(52) U.S. Cl.
CPC .................................. *B60F 3/0015* (2013.01)

(58) Field of Classification Search
CPC ....... B60F 3/00; B60F 3/0015; B62D 55/286; B62D 55/28; B62D 55/18; B63C 13/00
USPC .................................. 440/12.5, 12.63, 12.64
See application file for complete search history.

(56) References Cited

U.S. PATENT DOCUMENTS

| 2,546,523 | A | 3/1951 | Reynolds | |
|---|---|---|---|---|
| 4,433,634 | A | 2/1984 | Coast | |
| 4,961,395 | A | 10/1990 | Coast | |
| 5,899,164 | A | 5/1999 | Coast | |
| 6,482,053 | B1 * | 11/2002 | Prestenbach | 440/12.63 |
| 6,655,757 | B2 * | 12/2003 | Prestenbach | 440/12.63 |
| 7,670,200 | B2 | 3/2010 | Wilson | |

* cited by examiner

*Primary Examiner* — Lars A Olson (74) *Attorney, Agent, or Firm* — Jones Walker LLP (57) ABSTRACT

In the specification and drawings an amphibious machine is described and shown with a first wheel and a second wheel; a track, the track comprising a first belt engaged to the first wheel and a second belt engaged to the second wheel, wherein the first belt and the second belt are constructed of a flexible material; the first belt and the second belt being substantially parallel to each other; and a space between the first belt and the second belt.

16 Claims, 8 Drawing Sheets

AMPHIBIOUS MACHINE

II. DETAILED DESCRIPTION

As required, detailed embodiments of the present invention are disclosed herein. However, it is to be understood that the disclosed embodiments are merely exemplary of the invention, which can be embodied in various forms. As such, any feature(s) used in one embodiment can be used in another embodiment. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting, but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward.

Alternate embodiments may be devised without departing from the spirit or the scope of the invention. Additionally, well-known elements of exemplary embodiments of the invention will not be described in detail or will be omitted so as not to obscure the relevant details of the invention.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The terms "connected" and/or "coupled," as used herein, are defined as connected, although not necessarily directly, and not necessarily mechanically.

Relational terms such as first and second, top and bottom, and the like may be used solely to distinguish one entity or action from another entity or action without necessarily requiring or implying any actual such relationship or order between such entities or actions. The terms "comprises," "comprising," or any other variation thereof are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

Herein various embodiments of the present invention are described. In many of the different embodiments, features are similar. Therefore, to avoid redundancy, repetitive description of these similar features may not be made in some circumstances. It shall be understood, however, that description of a first-appearing feature applies to the later described similar feature and each respective description, therefore, is to be incorporated therein without such repetition.

Described now are exemplary embodiments. Referring to the drawings, beginning with FIGS. 1 to 4, an exemplary embodiment of an amphibious machine 100 is shown. The amphibious machine 100 can be a vehicle that is operable on dry land, wet land, and water. In an embodiment, the amphibious machine 100 can be a vehicle, such as a vehicle known as a marsh buggy, for use in marshy or swampy terrain. The amphibious machine 100 has two pontoons 102 that have a weight and volume configured to provide buoyancy for the amphibious machine 100 when in an aquatic environment. A plurality of wheels 104, such as bogie wheels, are connected to each pontoon 102. A track 106 surrounds each pontoon 102 and engages the wheels 104. The tracks 106 are engaged with and are driven or powered by motors 108, such as direct drive hydraulic motors, in order to move the amphibious machine 100. The tracks 106 also engage sprockets 110, which can be used to adjust the tension of the tracks 106. Each track 106 is an endless or continuous track, and forms a complete loop.

Figure 1:
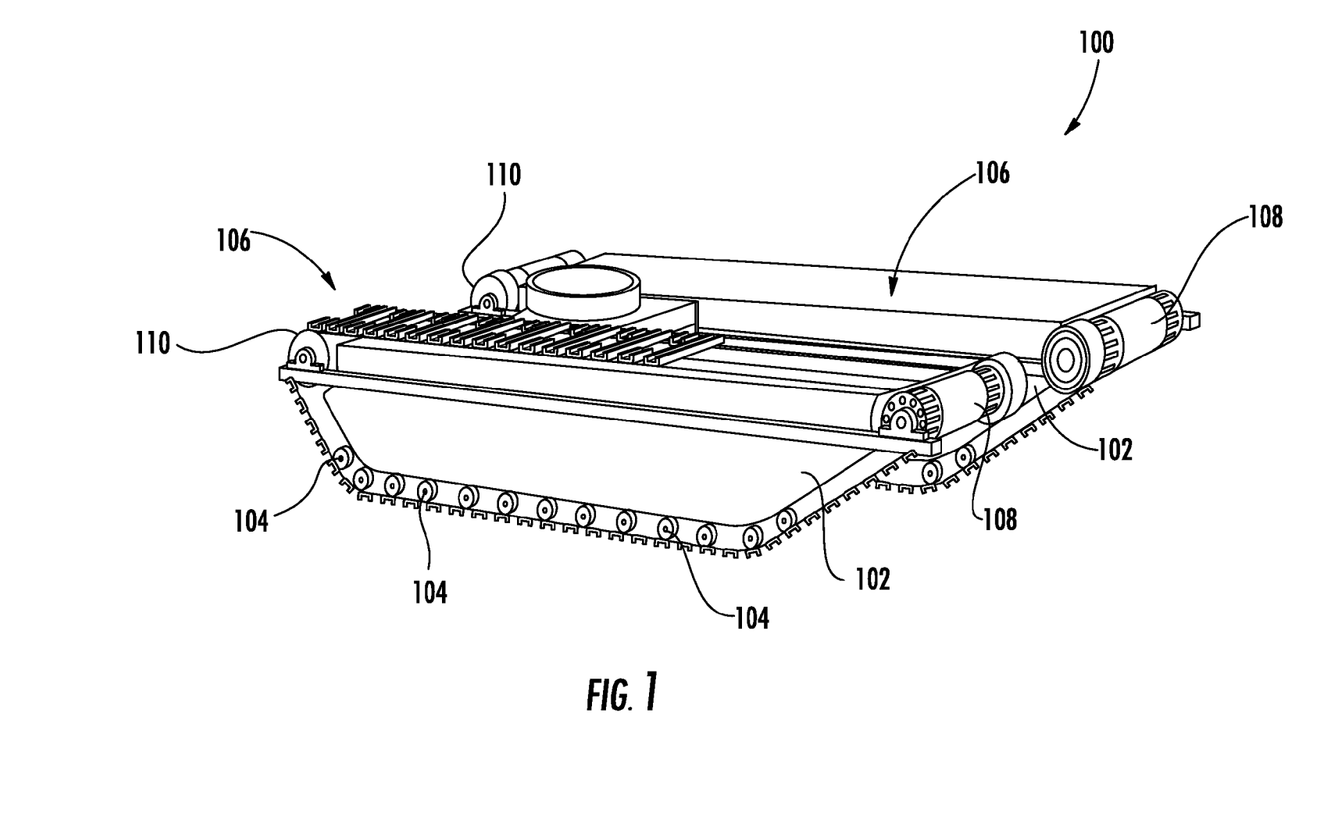
FIG. 1 is a perspective view of an embodiment described herein.
Figure 2:
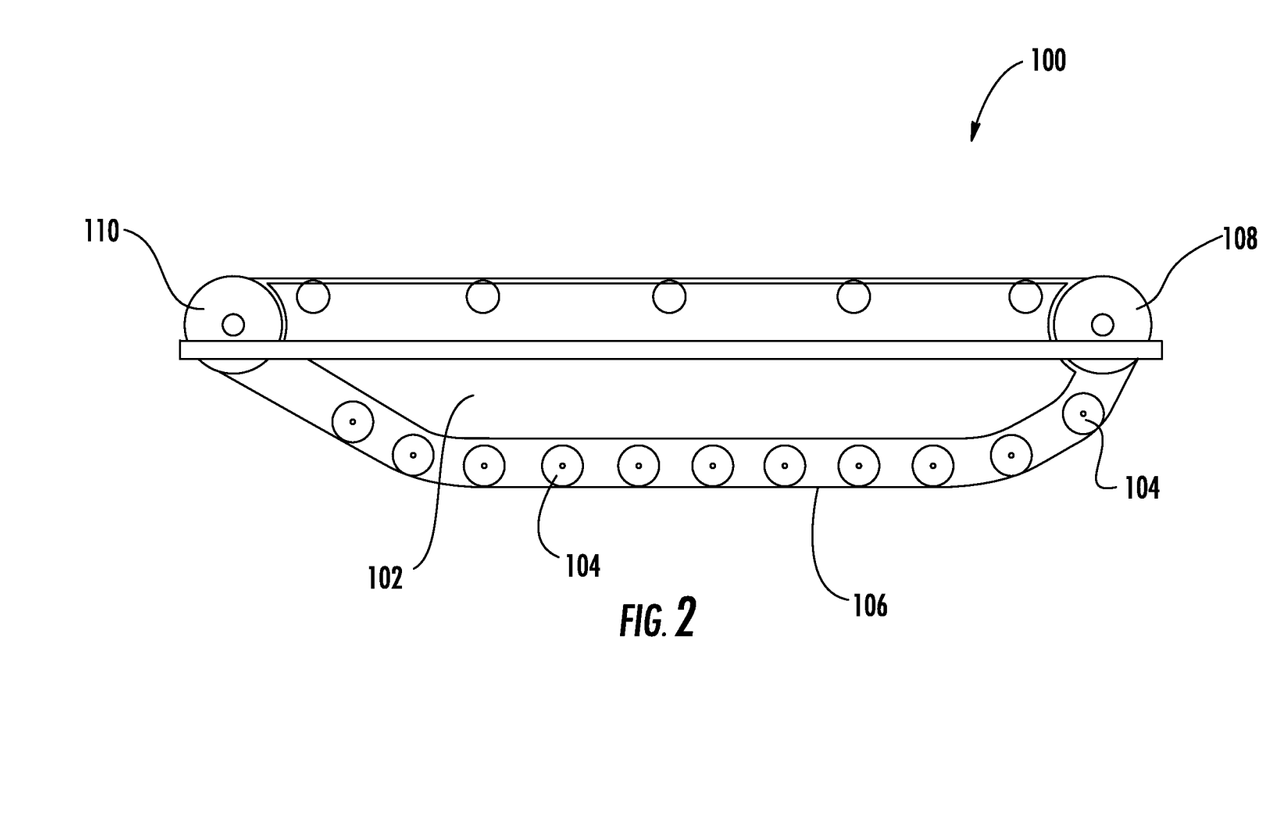
FIG. 2 is a side elevation view of an embodiment described herein.
Figure 3:
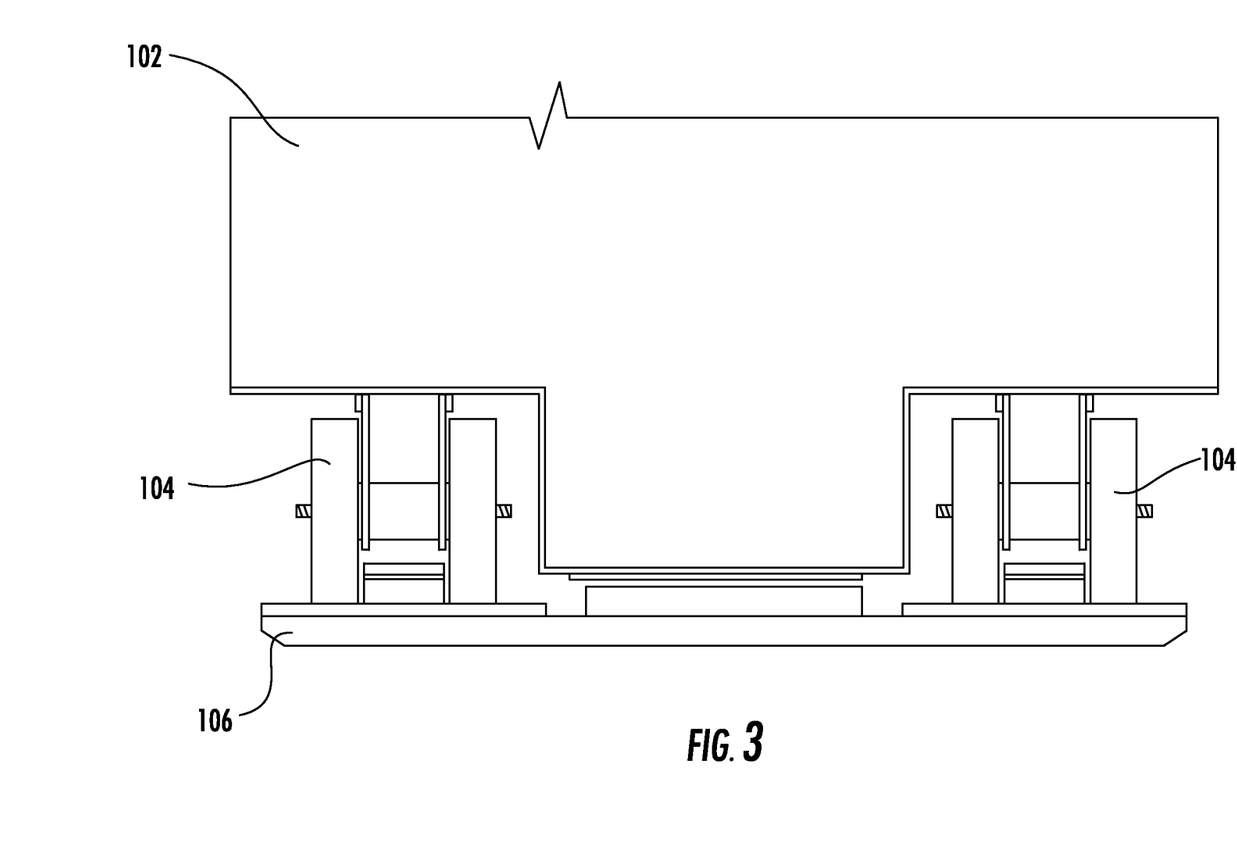
FIG. 3 is a partial front elevation view of an embodiment described herein.
Figure 4:
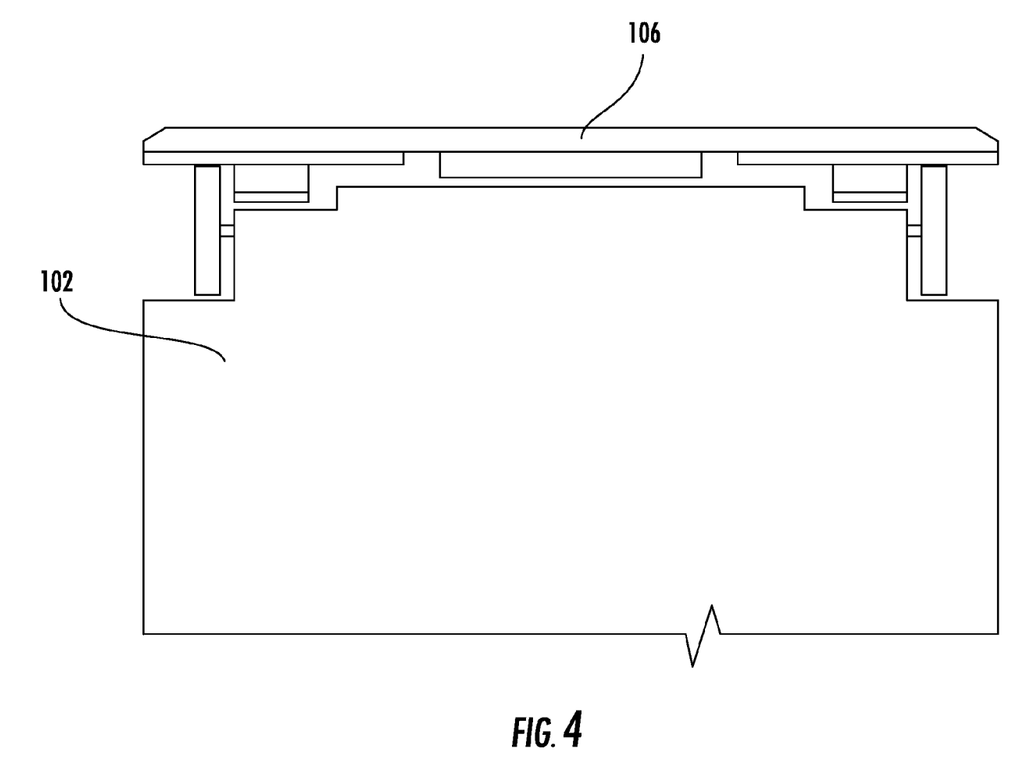
FIG. 4 is a partial front elevation view of an embodiment described herein.
Figure 5:
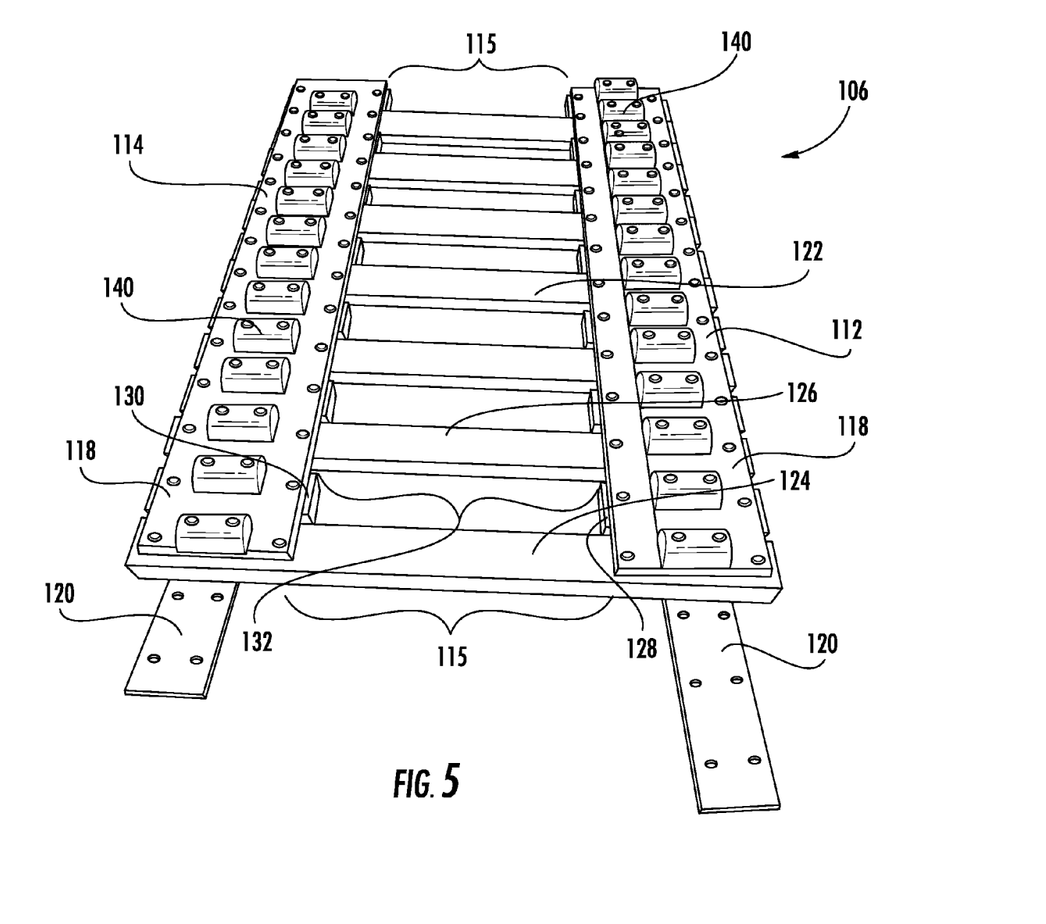
FIG. 5 is a perspective view of an embodiment described herein.
Figure 6:
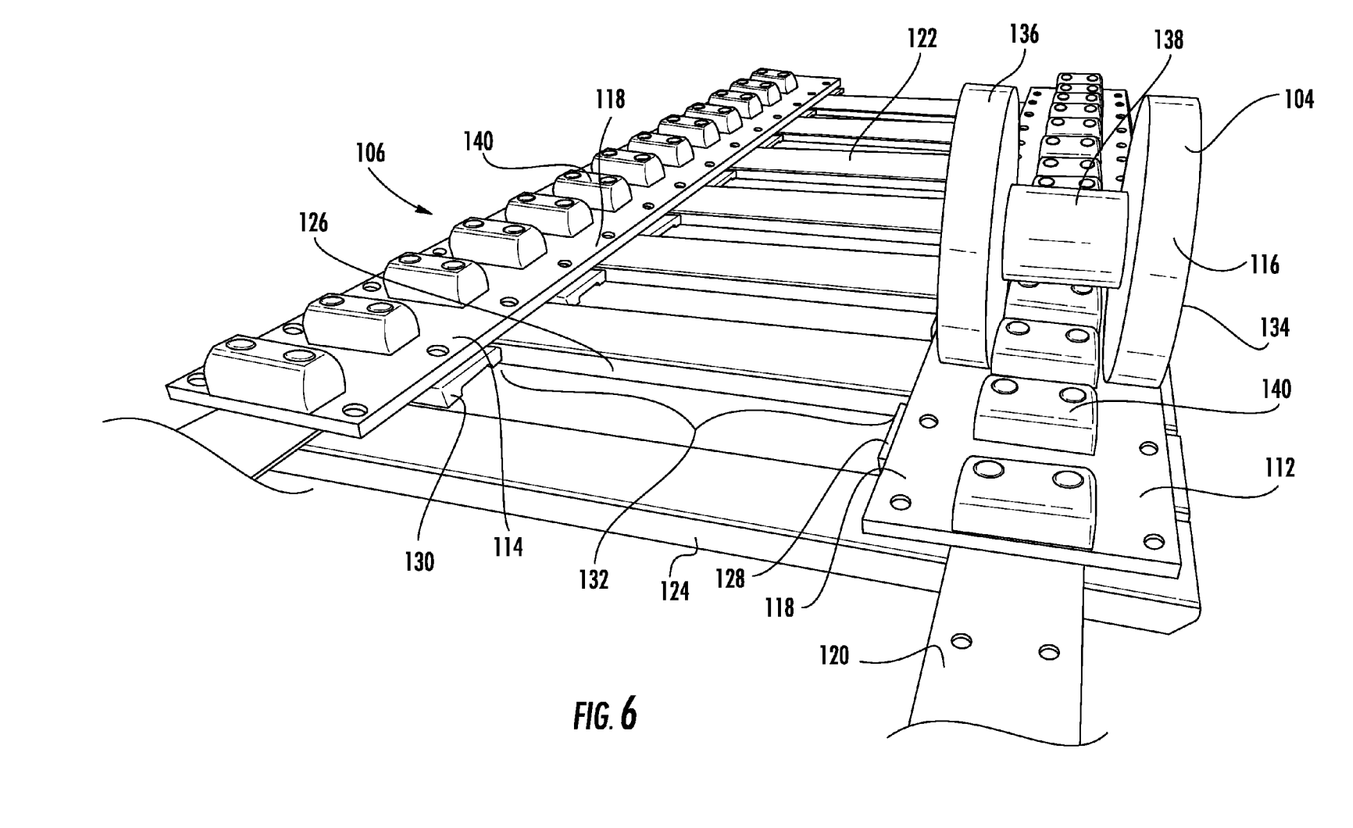
FIG. 6 is a perspective view of an embodiment described herein.
Figure 7:
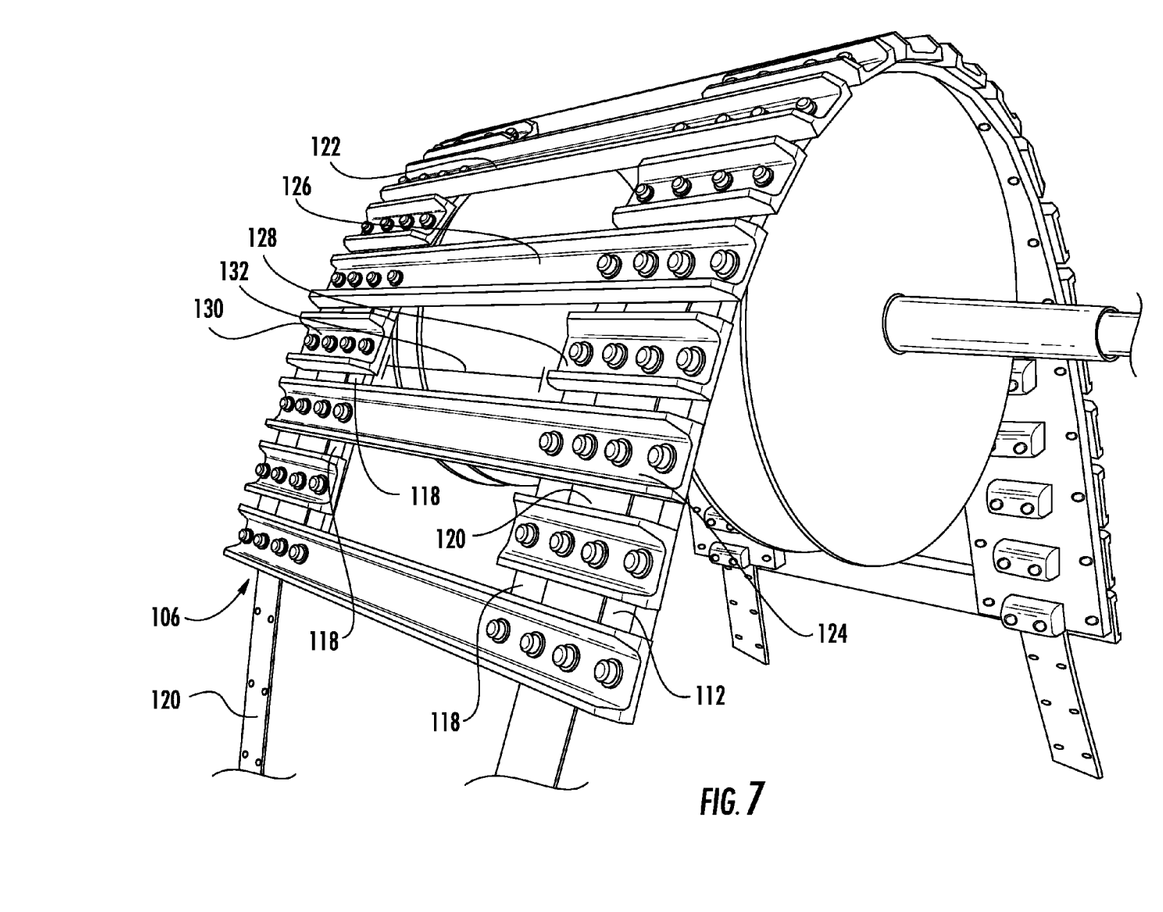
FIG. 7 is a perspective view of an embodiment described herein.

Referring to FIGS. 5 to 7, a partial section of a track 106 is shown. The track has a first belt 112 and a second belt 114 which are substantially parallel to each other and which have a space 115 between them. In operation, the first belt 112 is engaged to a first plurality of wheels 104 and the second belt 114 is engaged to a second plurality of wheels 104. In FIG. 6, the wheel 104 is a first wheel 116 and is engaged to the first belt 112. Belts 112 and 114 are constructed of a flexible material, which allows the belts to travel around the pontoons 102 when the amphibious machine 100 is in motion. The flexible material can be materials such as natural or synthetic rubber, or other suitable materials. The use of a flexible material such as natural or synthetic rubber (as opposed to, for example, a steel roller chain) can reduce friction between the tracks 106 and the wheels 104 and can eliminate the need to lubricate the tracks 106.

Each of the belts 112 and 114 can have a first layer 118 and a second layer 120, with the first layer 118 being bonded, laminated, or otherwise connected to the second layer 120. In the embodiments shown in FIGS. 5 to 7, the first layer 118 is constructed of the flexible material such as natural or synthetic rubber. The second layer 120 is constructed of a flexible reinforcing material, which can increase the strength of the belts 112 and 114, and thus the track 106. In some embodiments, the first layer 118 of rubber of the narrow belts 112 and 114 is not as strong as would be a wide single rubber belt that extended across the space 115, and therefore the belts 112 and 114 could break when the amphibious machine 100 is in use.

The addition of the second layer 120 of flexible reinforcing material can strengthen the belts 112 and 114 and avoid such breakage. The flexible reinforcing material can also reduce or eliminate the belt's ability to stretch, which can reduce the need for adjustments to the belt. The flexible reinforcing material can be made of a metal such as steel, or any other suitable material. As shown in FIG. 6, in an embodiment the first layer 118 of flexible material of the first belt 112 is in contact with the first wheel 116.

Referring still to FIGS. 5 to 7, a plurality of cleats 122 that are connected to the first belt 112 and the second belt 114 and extend across the space 115 between the first belt 112 and the second belt 114. The cleats 122 can be constructed of metal, such as aluminum or steel, plastic, or any other suitable material. As show in FIGS. 5 to 7, an embodiment includes a first cleat 124, a second cleat 126, a third cleat 128, and a fourth cleat 130. The first cleat 124 and second cleat 126 are each connected to the first belt 112 and the second belt 114. The third cleat 128 and fourth cleat 130 are shorter in length than the first cleat 124 and the second cleat 126. In the embodiments shown in FIGS. 5 to 7, the third cleat 128 is connected to the first belt 112 but not the second belt 114, and the fourth cleat 130 is connected to the second belt 114 but not the first belt 112. Such an arrangement creates a gap or space 132 between the third cleat 128 and the fourth cleat 130. The space 132 between the third cleat 128 and the fourth cleat 130 and/or the space 115 between the first belt 112 and the second belt 114 can reduce or eliminate the amount of material (e.g. mud, organic matter, or other debris) that would otherwise tend to build up between the pontoon 102 and the track 106. The presence of the third cleat 128 and fourth cleat 130 between the first cleat 124 and the second cleat 126 also forms a more complete row of cleats along a given belt 112 or 114, and avoids there being a significant gap between the first cleat 124 and the second cleat 126 along a given belt 112 or 114. The avoidance of such a gap between the first cleat 124 and the second cleat 126 can, among other things, create a smoother ride when the amphibious machine 100 is in motion.

Referring now to FIG. 6, the wheel 104 can include a first roller 134, a second roller 136, and a rod 138 extending between the first roller 134 and the second roller 136 and connecting the first roller 134 to the second roller 136. The rollers 134, 136 and the rod 138 can be constructed of metal, such as aluminum or steel, plastic, or any other suitable material. A plurality of guides 140 can be connected to the first belt 112 and/or the second belt 114. The guides 140 are disposed between the first roller 134 and the second roller 136, and can serve to keep the belts 112 and/or 114 (and thus the track 106) engaged with the wheels 104.

Figure 8:
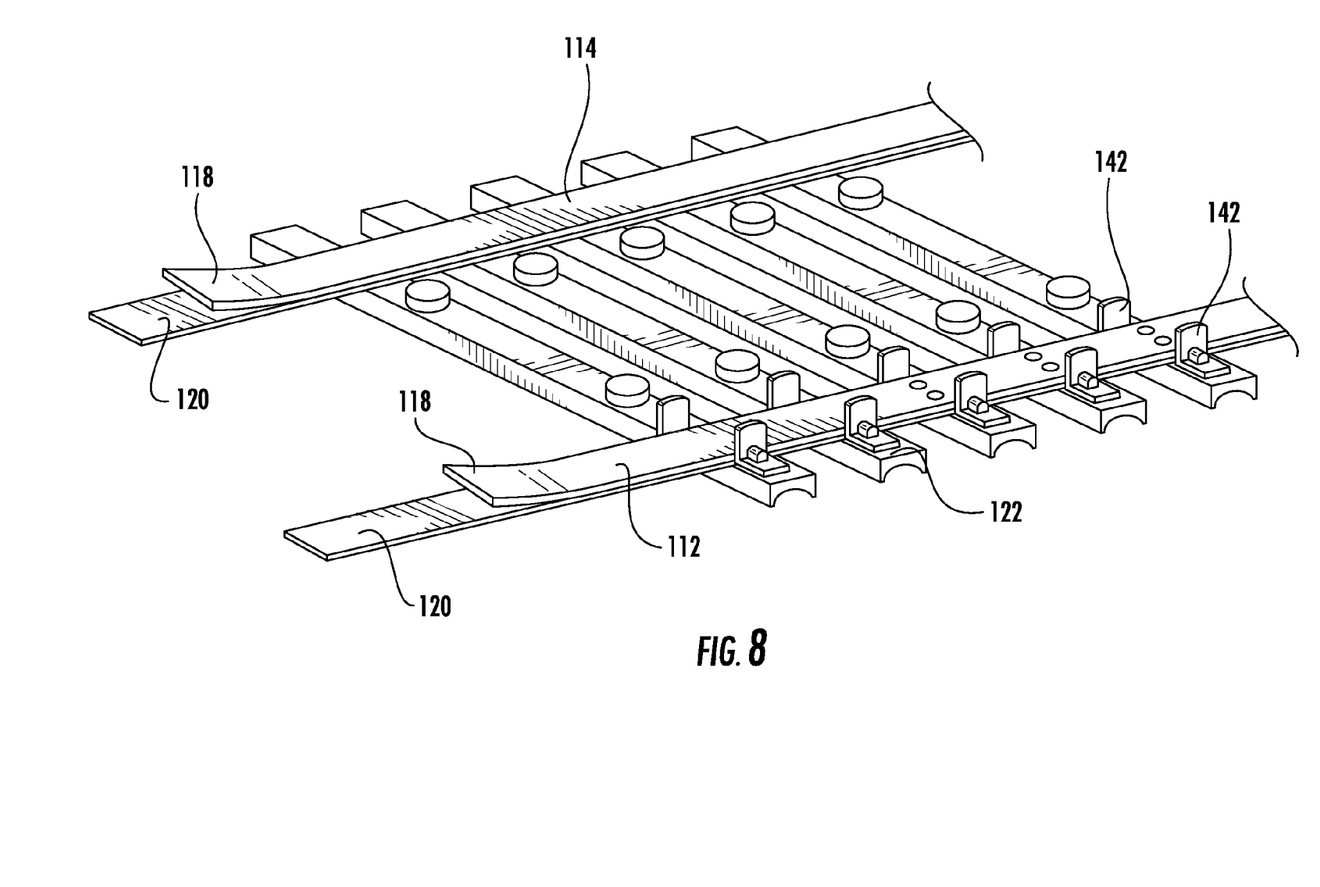
FIG. 8 is a perspective view of an embodiment described herein.

Referring now to FIG. 8, an alternative embodiment is shown in which a plurality of opposing wheel guides 142 are located on both sides of the first belt 112 and both sides of the second belt 114. In such an embodiment, the first roller and the second roller of the wheel can essentially be combined into a single roller (i.e. a simple wheel) that sits between the opposing wheel guides 142.

The embodiments shown in the drawings and described above are exemplary of numerous embodiments that may be made within the scope of the appended claims. It is contemplated that numerous other configurations may be used, and the material of each component may be selected from numerous materials other than those specifically disclosed. In short, it is the applicant's intention that the scope of the patent issuing herefrom will be limited only by the scope of the appended claims.

I claim:

1. An amphibious machine comprising:
   a) a first wheel and a second wheel;
   b) a track, the track comprising a first belt engaged to the first wheel and a second belt engaged to the second wheel, wherein the first belt and the second belt are constructed of a flexible material;
   c) the first belt and the second belt being substantially parallel to but spaced apart from each other; and
   d) a space between the first belt and the second belt;
   (e) a series of first cleats, each first cleat connected to the first and the second belts and extending between;
   (f) a series of second cleats, each of said second cleats attached to said second belt but not contacting or attached to said first belt; and
   (g) a series of third cleats, each of said third cleats attached to the first belt but not contacting or attached to said second belt.

2. The amphibious machine of claim 1, wherein at least one of said third cleats and one of said second cleats are positioned between two of said first cleats.

3. The amphibious machine of claim 1, wherein the flexible material is natural or synthetic rubber.

4. The amphibious machine of claim 3, wherein the first belt comprises a flexible reinforcing material connected to the first belt.

5. The amphibious machine of claim 4, wherein the flexible reinforcing material is metal.

6. The amphibious machine of claim 4, wherein the flexible reinforcing material is steel.

7. The amphibious machine of claim 4, wherein the flexible material of the first belt is in contact with the first wheel.

8. The amphibious machine of claim 1, wherein the first wheel comprises a first roller, a second roller, and a rod, the rod connecting the first roller to the second roller.

9. The amphibious machine of claim 8, further comprising a guide connected to the first belt, the guide being disposed between the first roller and the second roller.

10. An amphibious machine comprising:
    a) a first wheel and a second wheel;
    b) a track, the track comprising a first belt engaged to the first wheel and a second belt engaged to the second wheel;
    c) the first belt and the second belt being substantially parallel to each other but spaced apart;
    d) a first cleat, the first cleat being connected to the first belt and to the second belt;
    e) a second cleat, the second cleat being connected to the first belt and to the second belt;
    f) a third cleat, the third cleat being connected to the first belt between the first cleat and the second cleat;
    g) a fourth cleat, the fourth cleat being connected to the second belt between the first cleat and the second cleat;
    h) the third cleat having a distal and proximal end and a first cleat axis extending there between, and the fourth cleat having a distal and proximal end and a second cleat axis extending there between, said first cleat axis and said second cleat axis being substantially aligned, and said proximal end of said third cleat facing said proximal end of said fourth cleat; and
    i) a space between the third cleat proximal end and the fourth cleat proximal end.

11. The amphibious machine of claim 10, wherein the first belt and the second belt are constructed of a flexible material.

12. The amphibious machine of claim 11, wherein the flexible material is natural or synthetic rubber.

13. The amphibious machine of claim 12, wherein the first belt further comprises a flexible reinforcing material connected to the first belt.

14. The amphibious machine of claim 13, wherein the flexible reinforcing material is metal.

15. The amphibious machine of claim 13, wherein the flexible reinforcing material is steel.

16. The amphibious machine of claim 13, wherein the flexible material of the first belt is in contact with the first wheel.

* * * * *